United States Patent
Hashimoto et al.

(10) Patent No.: US 6,969,943 B2
(45) Date of Patent: *Nov. 29, 2005

(54) ACOUSTIC MATCHING LAYER AND ULTRASONIC TRANSDUCER

(75) Inventors: Kazuhiko Hashimoto, Moriguchi (JP); Takashi Hashida, Osaka (JP); Masaaki Suzuki, Osaka (JP); Masahiko Hashimoto, Shijonawate (JP); Hidetomo Nagahara, Kyoto (JP); Seigo Shiraishi, Neyagawa (JP); Norihisa Takahara, Ibaraki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/475,426

(22) PCT Filed: Jan. 28, 2003

(86) PCT No.: PCT/JP03/00812

§ 371 (c)(1),
(2), (4) Date: Oct. 21, 2003

(87) PCT Pub. No.: WO03/064980

PCT Pub. Date: Aug. 7, 2003

(65) Prior Publication Data

US 2004/0113523 A1   Jun. 17, 2004

(30) Foreign Application Priority Data

Jan. 28, 2002  (JP) ............................ 2002-018047
Feb. 5, 2002   (JP) ............................ 2002-027834

(51) Int. Cl.$^7$ ............................................ H01L 41/08
(52) U.S. Cl. ...................................................... 310/334
(58) Field of Search .............................. 310/325, 326, 310/334–337, 311

(56) References Cited

U.S. PATENT DOCUMENTS

| 4,277,367 A | * | 7/1981 | Madsen et al. ................. 436/8 |
| 5,093,810 A | | 3/1992 | Gill |
| 5,143,636 A | * | 9/1992 | Gaucher et al. ........ 252/62.9 R |
| 6,776,051 B2 | * | 8/2004 | Suzuki et al. ............. 73/861.27 |
| 6,788,620 B2 | * | 9/2004 | Shiraishi et al. ............ 367/152 |

FOREIGN PATENT DOCUMENTS

| JP | 57-097300 A | 6/1982 |
| JP | 63-061161 A | 3/1988 |
| JP | 10-253604 A | 9/1998 |
| JP | 2002-259267 A | 9/2002 |

\* cited by examiner

*Primary Examiner*—Mark Budd
(74) *Attorney, Agent, or Firm*—Akin Gump Strauss Hauer & Feld, LLP

(57) ABSTRACT

An acoustic matching layer according to the present invention includes a powder of a dry gel. The dry gel preferably has a density of 500 kg/m$^3$ or less and an average pore diameter of 100 nm or less. By using the dry gel powder, a variation in the property of the acoustic matching layer can be reduced.

23 Claims, 10 Drawing Sheets

ACOUSTIC MATCHING LAYER AND ULTRASONIC TRANSDUCER

CROSS-REFERENCE TO RELATED APPLICATION

This application is a Section 371 of International Application No. PCT/JP03/00812, filed Jan. 28, 2003 the disclosure of which is incorporated herein by reference.

TECHNICAL FIELD

The present invention relates to an acoustic matching layer for use to match acoustic impedance, an ultrasonic transducer to transmit or receive an ultrasonic wave, a method of making the acoustic matching layer, a method for fabricating the ultrasonic transducer, and an ultrasonic flowmeter including the ultrasonic transducer.

BACKGROUND ART

FIG. 10 is a cross-sectional view schematically showing a configuration for a conventional ultrasonic generator (which will also be referred to herein as a "piezoelectric vibrator") 10. The ultrasonic generator 10 includes a case 1, a piezoelectric layer (vibrating means) 2 and an acoustic impedance matching layer (or matching means, which will be referred to herein as an "acoustic matching layer"). The case 1 and the piezoelectric layer 2 are bonded together by way of an adhesive layer of an epoxy adhesive, for example. The case 1 and the acoustic matching layer 100 are also connected together with a similar adhesive. The piezoelectric layer vibrates at about 500 kHz. The vibrations are transmitted to the case 1 by way of the adhesive layer (not shown) and then to the acoustic matching layer 100 by way of the second adhesive layer. Then, the vibrations of the acoustic matching layer 100 are propagated as acoustic waves into a gas that exists in the space. Although not described in detail for the sake of simplicity, two electrodes (not shown) are provided on the upper and lower surfaces of the piezoelectric layer 2 to polarize the piezoelectric layer 2 in the thickness direction. The ultrasonic generator 10 can convert electrical energy into mechanical energy, or vice versa, by using the piezoelectric layer 2. The case 1 includes a top plate 1a that defines a concave portion to embed the piezoelectric layer 2 therein and a bottom plate 1b that is arranged so as to close up the inner space of the concave portion hermetically. The piezoelectric layer 2 is included hermetically inside of the concave portion. One of the two electrodes on the two principal surfaces of the piezoelectric layer 2 is connected to a terminal 5a by way of the case 1, while the other electrode is connected to a terminal 5b. Accordingly, the case 1 is normally made of a metal with electrical conductivity.

It is the role of the acoustic matching layer 100 to propagate the vibrations of the piezoelectric layer 2 to the gas efficiently. The acoustic impedance Z of a substance is defined by the following Equation (1):

$$Z = \rho \times C \quad (1)$$

where C is the sonic velocity in the substance and ρ is the density of the substance. The acoustic impedance Z of the piezoelectric layer 2 is significantly different from that of the gas.

Specifically, the acoustic impedance Z1 of a piezoelectric body that makes the piezoelectric layer 2 is 30×10⁶ kg/s·m², while the acoustic impedance Z3 of the gas (e.g., the air) is 4.28×10² kg/s·m². The acoustic impedance of the piezoelectric body is approximately equal to that of a metal. In this manner, sound (i.e., a vibration) being propagated is reflected from the boundary surface between two substances with mutually different acoustic impedances. As a result, the sound transmitted has a decreased intensity. However, by inserting a substance with a third acoustic impedance between the two substances with mutually different acoustic impedances, such sound reflection can be reduced.

It is generally known that the sound reflection can be eliminated by inserting a substance, of which the acoustic impedance Z2 satisfies the following Equation (2), between the piezoelectric layer 2 and the space (i.e., the gas medium into which the acoustic wave is radiated):

$$Z2 = (Z1 \cdot Z3)^{1/2} \quad (2)$$

If the acoustic impedances Z1 (=30×10⁶ kg/s·m²) and Z3 (=4.28×10² kg/s·m²) described above are substituted into this equation, then the resultant Z2 value will be 0.11×10⁶ kg/s·m². A substance having such an acoustic impedance needs to be a solid with a low density and a low sonic velocity.

Even in a gas ultrasonic generator that uses a piezoelectric body of PZT, for example, a matching layer for matching the acoustic impedance of the piezoelectric body to that of the gas (e.g., the air) is normally provided on the vibrating surface in order to radiate the ultrasonic wave, generated in the PZT, to the gas as the propagating medium. In an ultrasonic transducer that radiates an ultrasonic wave, generated in PZT, into the air, the acoustic impedance Z1 (of about 400 kg/s·m²) of the air (i.e., the gas) is far smaller than (i.e., approximately one-hundred-thousandth of) the acoustic impedance Z3 (of about 30×10⁵ kg/s·m²) of PZT (i.e., the solid). Thus, for such an ultrasonic transducer to radiate the ultrasonic wave efficiently, the acoustic impedance of the acoustic matching layer thereof is a key factor.

As a conventional acoustic matching layer to be provided on the vibrating surface of a piezoelectric layer (which will be sometimes referred to herein as an "piezoelectric vibrator") made of a piezoceramic such as PZT (lead zirconate titanate), an acoustic matching layer 100 made of an epoxy resin 112, in which glass balloons (tiny hollow glass spheres) 110 are dispersed, is known as shown in FIG. 11. The acoustic matching layer 100 has its density decreased by solidifying the tiny glass balloons 110 with the epoxy resin 112. The glass balloons 110 have diameters of 100 μm or less, because the glass balloons 110 needs to be sufficiently smaller than the wavelength of the sound being propagated through the acoustic matching layer.

The intensity of the sound to be propagated into the gas after having been transmitted through the acoustic matching layer 100 is also changeable with the thickness of the acoustic matching layer 100 (i.e., the distance that the acoustic wave goes through the acoustic matching layer). The acoustic wave that has come from the piezoelectric layer 2 splits into a wave to be transmitted and a wave to be reflected from the boundary surface between the acoustic matching layer 100 and the gas. The reflected wave is further reflected from the boundary surface between the acoustic matching layer 100 and the piezoelectric layer 2 to have its phase inverted. Thereafter, a portion of this wave will be transmitted through the boundary surface between the acoustic matching layer 100 and the gas. The thickness t at which the transmittance T is maximized through the synthesis of these waves is given by t=λ/4.

When the acoustic matching layer 100 including the glass balloons 110 is used, the acoustic matching layer 100 has a sonic velocity of 2,000 m/s. Accordingly, if the sound has a frequency of 500 kHz, then the sound being propagated through the acoustic matching layer 100 has a wavelength λ of 4 mm. Thus, the best thickness t of the acoustic matching layer 100 is 1 mm.

If the thickness t of the acoustic matching layer is defined to be an integral number of times as large as λ/4, then a theoretical equation for calculating the transmittance T of an ultrasonic energy to be radiated from an ultrasonic vibrator into an external propagating medium where the acoustic matching layer is provided on the vibrating surface of the ultrasonic vibrator can be represented as the following simplified Equation (3):

$$T = 4 \cdot Z1 \cdot Z3 \cdot Z2^2 / (Z1 \cdot Z3 + Z2^2)^2 \quad (3)$$

The relationship between the transmittance T of an ultrasonic energy through the air and the acoustic impedance Z2 of the acoustic matching layer 100, made of the conventional epoxy resin with glass balloons, will be described. Specifically, the epoxy resin with glass balloons has an acoustic impedance of about $1.2 \times 10^6$ kg/s·m², and $Z2^2 \approx 1.44 \times 10^{12}$. In the example described above, $Z1 \cdot Z3 = 400 \times 1.2 \times 10^6 = 4.8 \times 10^8$. Thus, $Z1 \cdot Z3 \ll Z2^2$. Accordingly, the Equation (3) described above is further approximated as $T \approx 4 \cdot Z1 \cdot Z3 / Z2^2$. Consequently, it can be seen that the transmittance T of the ultrasonic energy is inversely proportional to the square of the acoustic impedance Z2 of the acoustic matching layer 100. That is to say, the smaller the acoustic impedance Z2 of the acoustic matching layer 100, the higher the transmittance T of the ultrasonic energy.

FIG. 9 schematically shows a configuration for an ultrasonic flowmeter including the ultrasonic generator 10 described above. In this example, a pair of ultrasonic generators 10 is used as a pair of ultrasonic transducers 101 and 102.

As shown in FIG. 9, the ultrasonic generators 101 and 102 are provided in the tube (or tube wall) 52 that defines the channel 51 of the gas. If the ultrasonic transducer 101 or 102 is broken, then the gas will leak out of the tube 52. For that reason, it is hard to choose an easily breakable material such as a ceramic or a resin as a material for the case (i.e., the case 1 shown in FIG. 9) of the ultrasonic transducers 101 and 102. Accordingly, a metal material such as stainless steel or iron is used as a material for the case.

Suppose a fluid is now flowing at a velocity V in the direction indicated by the bold arrow along a channel 51 as shown in FIG. 9. The ultrasonic transducers 101 and 102 are provided in the tube wall 52 so as to face each other. Each of the ultrasonic transducers 101 and 102 includes a piezoelectric vibrator, made of a piezoceramic, for example, as an electromechanical energy converter, and exhibits a resonance characteristic just like a piezoelectric buzzer or a piezoelectric oscillator. In this example, the ultrasonic transducer 101 is used as an ultrasonic transmitter and the ultrasonic transducer 102 is used as an ultrasonic receiver. A driver circuit 54, a reception sensing circuit 56, a timer 57, a calculating section 58, and a control section 59 are connected to the ultrasonic transducers 101 and 102 by way of a switching circuit 55 that switches the transmission and reception of the transducers. The driver circuit 54 drives the ultrasonic transducers 101 and 102. The reception sensing circuit 56 senses an ultrasonic pulse received. The timer 57 measures the propagation time of the ultrasonic pulse. The calculating section 58 calculates the flow rate based on the output of the timer 57. The control section 59 outputs a control signal to the driver circuit 54 and timer 57.

Hereinafter, it will be described how this ultrasonic flowmeter operates.

When an alternating current voltage, having a frequency in the vicinity of the resonant frequency, is applied to the piezoelectric layer of the ultrasonic transducer 101, the ultrasonic transducer 101 radiates an ultrasonic wave into the external fluid such that the ultrasonic wave goes along the propagation path L shown in FIG. 9. Then, the ultrasonic transducer 102 receives the ultrasonic wave propagated and transforms it into a voltage.

Thereafter, the ultrasonic transducer 102 is used as an ultrasonic transmitter and the ultrasonic transducer 101 is used as an ultrasonic receiver in turn. Specifically, when an alternating current voltage, having a frequency in the vicinity of the resonant frequency, is applied to the piezoelectric layer of the ultrasonic transducer 102, the ultrasonic transducer 102 radiates an ultrasonic wave into the external fluid such that the ultrasonic wave goes along the propagation path L shown in FIG. 9. Then, the ultrasonic transducer 101 receives the ultrasonic wave propagated and transforms it into a voltage. In this manner, each of the ultrasonic transducers 101 and 102 alternately functions as a receiver and as a transmitter. Thus, these transducers 101 and 102 are sometimes called "ultrasonic transceivers". The directions in which the ultrasonic wave is propagated along the propagation path L are indicated by the arrow with L bidirectionally.

In FIG. 9, the flow velocity of the fluid flowing through the tube 52 is supposed to be V, the velocity of the ultrasonic wave in the fluid is supposed to be C, and the angle defined between the direction in which the fluid is flowing (as indicated by the bold arrow) and the direction in which the ultrasonic pulse is propagated (as indicated by the arrow with L) is supposed to be θ. If the ultrasonic transducers 101 and 102 are used as a transmitter and a receiver, respectively, then the following Equation (4) is satisfied:

$$f1 = 1/t1 = (C + V \cos \theta)/L \quad (4)$$

where t1 is the sing-around period (i.e., the time it takes for the ultrasonic pulse, radiated from the ultrasonic transducer 101, to reach the ultrasonic transducer 102) and f1 is the sing-around frequency.

Conversely, if the ultrasonic transducers 102 and 101 are used as a transmitter and a receiver, respectively, then the following Equation (5) is satisfied:

$$f2 = 1/t2 = (C - V \cos \theta)/L \quad (5)$$

where t2 is the sing-around period and f2 is the sing-around frequency in that situation.

The difference Δf between these two sing-around frequencies is given by the following Equation (6):

$$\Delta f = f1 - f2 = 2V \cos \theta / L \quad (6)$$

According to Equation (6), the flow velocity V of the fluid can be obtained from the distance L of the ultrasonic wave propagation path and the frequency difference Δf. And the flow rate can be determined by the flow velocity V.

In the conventional ultrasonic generators, the acoustic matching layer thereof is often made of a material with a low density (e.g., a material obtained by solidifying a glass balloon or a plastic balloon with a resin material) to decrease the acoustic impedance thereof. Or the acoustic matching layer may also be formed by a technique of thermally compressing a glass balloon or a technique of foaming a molten material. These methods are disclosed in Japanese Patent No. 2559144, for example.

The conventional acoustic matching layer has its acoustic impedance Z2 decreased by introducing glass balloons, of which the particle sizes are smaller than the wavelength of the ultrasonic wave, into an epoxy resin (i.e., by dispersing air gaps, having too small acoustic impedances to diffuse the ultrasonic wave, in the epoxy resin). Thus, it is imaginable to further decrease the acoustic impedance by increasing the mixture ratio of the glass balloons to the epoxy resin. However, if the mixture ratio of the glass balloons is increased, then the epoxy resin agent with those glass balloons will have an increased viscosity, thus making it hard to mix the glass balloons and the epoxy resin agent together uniformly. For that reason, the mixture ratio of the glass balloons to the epoxy resin agent cannot be increased to beyond a certain limit. Consequently, it is difficult to make an acoustic matching layer with even lower acoustic impedance of the epoxy resin with glass balloons.

Also, the acoustic matching layer made of the conventional epoxy resin with glass balloons has an acoustic impedance of about $1.2 \times 10^6$ kg/s·m², which is approximately two-thirds of that of an acoustic matching layer made of the epoxy resin only. Thus, the ultrasonic energy transmittance T can be 9/4 times as high as that of the acoustic matching layer made of the epoxy resin only.

Even so, when the ultrasonic energy transmittance T is calculated by the Equation (3) described above on such an acoustic matching layer made of the epoxy resin with glass balloons, it can be seen that $T \approx 3\%$, which is not sufficient.

Also, the acoustic matching layer included in the conventional ultrasonic transducer for use in an ultrasonic flowmeter is obtained by thermally compressing glass balloons or foaming a molten material as described above. Thus, the medium easily becomes non-uniform due to the damage of the glass spheres under excessive pressures, separation of the glass spheres under insufficient pressures or foaming of the peeled molten material. As a result, a variation in characteristic is created in the same acoustic matching layer and the precision of the equipment also varies unintentionally.

Furthermore, in the manufacturing process of the conventional acoustic matching layer made of the epoxy resin with glass balloons, the cured epoxy resin with the glass balloons is subjected to some machining process such as cutting and/or surface polishing to adjust the sizes and/or thickness thereof to desired values. Thus, the acoustic matching layer may have a thickness that is significantly different from its preferred value, non-uniform thicknesses, or surface unevenness. As a result, the performance of the resultant ultrasonic transducer was not good enough.

On the other hand, the applicant of the present application disclosed in Japanese Patent Application No. 2001- 56501 (filed on Feb. 28, 2001) that an acoustic matching layer made of a dry gel exhibits a reduced variation in characteristic as compared with the conventional epoxy resin with the glass balloons.

However, in order to achieve even higher performance for ultrasonic flowmeters, for example, the variation in the characteristic of such an acoustic matching layer made of a dry gel is preferably further reduced.

The present inventors discovered via experiments that even an acoustic matching layer made of a dry gel still exhibited some variation in thickness, which was smaller than the conventional one, though. The present inventors also discovered that if the dry gel was formed by drying a wet gel, the variation in characteristic was caused due to the non-uniformity of the drying process step.

DISCLOSURE OF INVENTION

In order to overcome the problems described above, a main object of the present invention is to provide an acoustic matching layer exhibiting a reduced variation in property as compared with a conventional one. Another object of the present invention is to provide an ultrasonic transducer and an ultrasonic flowmeter including such an acoustic matching layer. Still another object of the present invention is to provide a method of making such an acoustic matching layer and a method for fabricating such an ultrasonic transducer.

An acoustic matching layer according to a first aspect of the present invention includes a powder of a dry gel.

In an embodiment, the dry gel has a density of 500 kg/m³ or less and an average pore diameter of 100 nm or less.

In another embodiment, the powder of the dry gel has a mean particle size of 1 $\mu$m to 100 $\mu$m.

In another embodiment, a skeleton of the dry gel includes an inorganic oxide. The skeleton is preferably hydrophobized.

In another embodiment, the inorganic oxide is silicon dioxide or aluminum oxide.

In another embodiment, the acoustic matching layer includes at most 40 mass % of thermal binding polymer powder.

In a specific embodiment, the thermal binding polymer powder has a mean particle size of 0.1 $\mu$m to 50 $\mu$m.

In another embodiment, the acoustic matching layer has an acoustic impedance of $5 \times 10^4$ kg/s·m² to $20 \times 10^4$ kg/s·m².

In another embodiment, a variation in the acoustic impedance of the acoustic matching layer per temperature is $-0.04\%/°$ C. or less (i.e., has an absolute value of $0.04\%/°$ C. or less) in the range of 25° C. to 70° C.

In another embodiment, the acoustic matching layer has a thickness that is approximately equal to a quarter of the wavelength $\lambda$ of an acoustic wave being propagated through the acoustic matching layer.

An ultrasonic transducer according to the first aspect of the present invention includes: a piezoelectric layer; and the acoustic matching layer according to any of the preferred embodiments of the present invention described above. The acoustic matching layer is provided on the piezoelectric layer.

In an embodiment, the acoustic matching layer is directly bonded onto the piezoelectric layer.

In another embodiment, the ultrasonic transducer further includes a case. The case includes: a top plate that defines a concave portion to embed the piezoelectric layer therein; and a bottom plate that is arranged so as to close up an inner space of the concave portion hermetically. The piezoelectric layer is adhered onto an inside surface of the top plate of the case. The acoustic matching layer is directly bonded onto the upper surface of the top plate so as to face the piezoelectric layer by way of the top plate.

An ultrasonic flowmeter according to the first aspect of the present invention includes: a flow rate measuring portion, through which a fluid under measurement flows; a pair of ultrasonic transducers, which is provided for the flow rate measuring portion and which transmits and receives an ultrasonic signal; a time measurement circuit for measuring time that it takes to propagate an ultrasonic wave between the pair of ultrasonic transducers; and a flow rate calculating circuit for calculating the flow rate of the fluid based on a signal supplied from the time measurement circuit. Each of the ultrasonic transducers is the ultrasonic transducer according to any of the preferred embodiments of the present invention described above.

A method of making an acoustic matching layer according to the first aspect of the present invention includes the steps of: preparing a powder mixture of a powder of a dry gel and a powder of a thermal binding polymer; and pressing and compacting the powder mixture.

In an embodiment, the step of preparing the powder mixture includes the steps of: preparing the dry gel; preparing the powder of the thermal binding polymer; and mixing and pulverizing the dry gel and the powder of the thermal binding polymer.

In another embodiment, the step of pressing and compacting the powder mixture includes the step of heating the powder mixture.

In another embodiment, the step of pressing and compacting the powder mixture includes the step of controlling the thickness of a compact, obtained by pressing and compacting the powder mixture, to a predetermined thickness.

In another embodiment, the step of pressing and compacting the powder mixture includes the steps of: feeding the powder mixture in a predetermined amount onto a lower compacting surface; and flattening the upper surface of a layer to be formed by the powder mixture that has been fed onto the lower compacting surface.

An ultrasonic transducer fabricating method according to the first aspect of the present invention is a method for fabricating an ultrasonic transducer that includes a piezoelectric layer and an acoustic matching layer provided on the piezoelectric layer. The method includes the step of forming the acoustic matching layer by the method according to any of the preferred embodiments of the present invention described above.

In an embodiment, the acoustic matching layer is directly bonded onto the piezoelectric layer.

In another embodiment, the ultrasonic transducer further includes a case. The case includes: a top plate that defines a concave portion to embed the piezoelectric layer therein; and a bottom plate that is arranged so as to close up an inner space of the concave portion hermetically. The acoustic matching layer is directly bonded onto the upper surface of the top plate of the case.

An ultrasonic transducer fabricating method according to a second aspect of the present invention is a method for fabricating an ultrasonic transducer that includes a piezoelectric layer and an acoustic matching layer provided on the piezoelectric layer. The process of forming the acoustic matching layer includes the steps of: (a) preparing a gel material solution; (b) providing a thickness regulating member having a predetermined height on a surface on which the acoustic matching layer will be defined; (c) feeding the gel material solution onto the surface; (d) substantially equalizing the thickness of a liquid layer, defined by the gel material solution that has been fed onto the surface, with the height of the thickness regulating member; (e) solidifying the gel material solution into a wet gel; and (f) drying the wet gel with a solvent removed therefrom, thereby obtaining the dry gel. In the ultrasonic transducer fabricating method according to the second aspect, the thickness of the acoustic matching layer is controlled at a predetermined thickness, thus minimizing the variation in property, which is usually caused by a variation in the thickness.

In an embodiment, the acoustic matching layer includes: a first acoustic matching layer, which is provided closer to the piezoelectric layer; and a second acoustic matching layer, which is provided on the first acoustic matching layer. The process of forming the second acoustic matching layer includes the steps (a) through (f).

In another embodiment, the height of the thickness regulating member is approximately equal to a quarter of the wavelength λ of an acoustic wave being propagated through the associated acoustic matching layer.

A dry gel for use in the acoustic matching layer of the present invention may include either an inorganic oxide or an organic polymer as its skeleton.

BEST MODE FOR CARRYING OUT THE INVENTION

An acoustic matching layer according to a first aspect of the present invention includes a powder of a dry gel. By making the acoustic matching layer of the dry gel powder, variation in characteristic, which would otherwise be caused by the non-uniformity of the wet gel being dried, can be minimized.

Figure 1A:
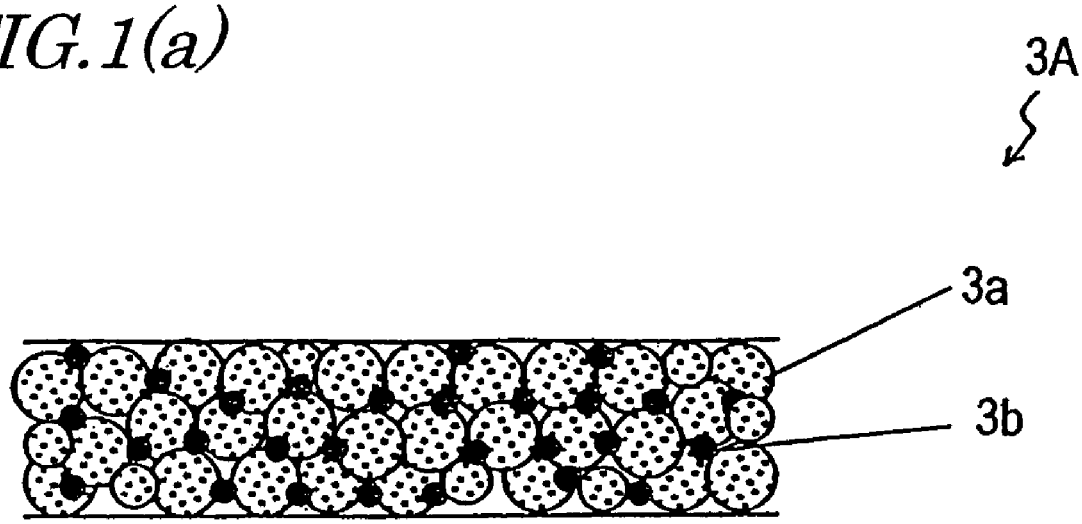
FIGS. 1(a) and 1(b) are cross-sectional views schematically showing structures of acoustic matching layers according to embodiments of the present invention.
Figure 1B:
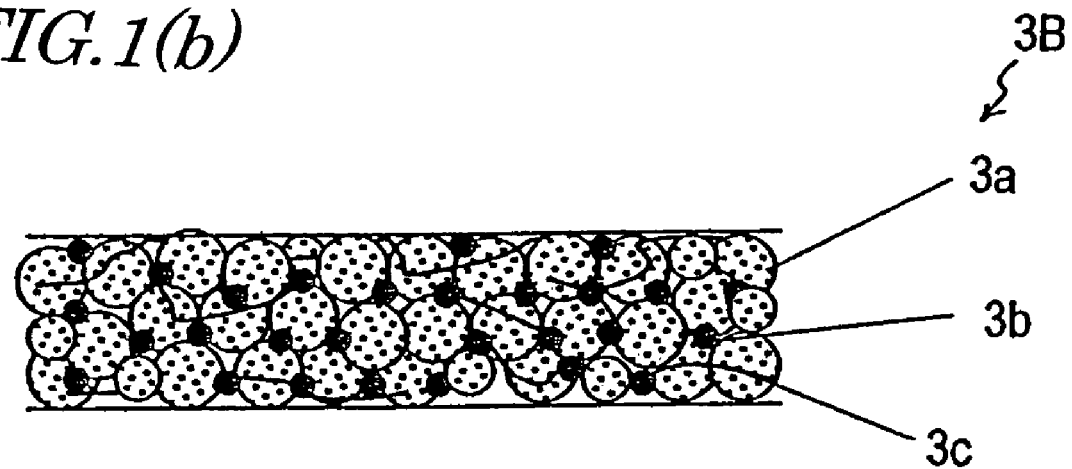

FIGS. 1(a) and 1(b) schematically illustrate structures for an acoustic matching layer according to an embodiment of the first aspect of the present invention.

The acoustic matching layer 3A shown in FIG. 1(a) is made up of a dry gel powder (which will be sometimes referred to herein as a "powder dry gel") 3a and an additive 3b.

As used herein, the "dry gel" is a porous body to be produced by a sol-gel process. Specifically, the dry gel is obtained by forming a solid skeleton through a reaction of a gel material solution, dissolving the skeleton in a solvent to obtain a wet gel, and then drying the wet gel to remove the solvent.

The dry gel is obtained by drying the wet gel with the solvent removed therefrom. This drying process step may be carried out either by a drying method requiring special conditions (e.g., supercritical drying and freeze drying) or by a normal drying method such as heat drying, low-pressure drying and air drying.

The supercritical drying technique is a method of removing the solvent in a supercritical state in which the temperature and pressure of the solvent are raised at least equal to those at the critical point thereof. In this method, there is no gas-liquid interface and no drying stress is placed on the skeleton of the gel. Thus, a dry gel with a very low density can be obtained without shrinking at all. However, the dry gel obtained by the supercritical drying technique may be subject to some operating environment stress such as condensation, thermal stress, chemical stress and mechanical stress.

On the other hand, a dry gel obtained by a normal drying method can resist the drying stress and is also highly resistant to the operating environment stress to which the dry gel will be subject after that. To obtain a low-density dry gel by such a normal drying method, the skeleton of the wet gel yet to be dried needs to be strengthened so as to bear the stress. The skeleton may be strengthened by ripening the skeleton, appropriately adjusting the temperature condition or using an easily polymerizable polyfunctional hydrophobizing agent in the hydrophobizing process step or controlling the size of micropores. Particularly when the flow rate of a gas should be measured, the acoustic matching layer may be used under various environments. Accordingly, the acoustic matching layer is preferably made of a dry gel that has been obtained by a normal drying method. Also, when a normal drying method is used, the equipment can be simplified and handled more easily because no high-pressure process is required unlike the supercritical drying method.

The dry gel obtained by the above method is a nanoporous body in which continuous pores with average pore diameters of 1 nm to 100 nm are defined by the nanometer-scale solid skeleton. Accordingly, when the density is as low as 500 kg/m$^3$ or less (preferably 400 kg/m$^3$ or less), the velocity of sound being propagated through the solid portion of the dry gel, which defines a unique network skeleton, is extremely low. In addition, the velocity of sound being propagated through the gas portion of the porous body is also extremely low due to the presence of those micropores. Accordingly, this acoustic matching layer has as low a sonic velocity as 500 m/s or less, thus achieving low acoustic impedance.

Furthermore, at the nanometer-scale micropores, the sizes of the micropores are approximately equal to, or smaller than, the mean free path of the gas molecules, and the pressure loss of the gas is significant. For that reason, even when such a porous body is used as the acoustic matching layer, the porous body can also radiate acoustic waves at a high sound pressure.

The powder dry gel preferably has a mean particle size of 1 μm to 100 μm. The reasons are as follows. Specifically, if the mean particle size was smaller than this lower limit, then the number of micropores in the powder would decrease so much as to diminish the effects unique to the dry gel. In addition, the amount of the additive needed in the compacting process step would increase too much to obtain a low-density acoustic matching layer easily. On the other hand, if the mean particle size of the powder dry gel was greater than the upper limit, then it would be difficult to control the thickness of the acoustic matching layer. In that case, an acoustic matching layer with a sufficiently uniform thickness and a sufficiently flat surface might be hard to obtain.

The skeleton of the dry gel may be an inorganic oxide or an organic polymer. Also, the skeleton is preferably hydrophobized. In that case, even if water or impurities exist in the gas under measurement, the acoustic matching layer would not be affected by their absorption or deposition so easily. As a result, a more reliable acoustic matching layer can be obtained.

The skeleton of the inorganic oxide dry gel may be hydrophobized with a surface treating agent such as a silane coupling agent. Examples of preferred surface treating agents include: halogen silane treating agents such as trimethylchlorosilane, dimethyldichlorosilane, methyltrichlorosilane and ethyltrichlorosilane; alkoxy silane treating agents such as trimethylmethoxysilane, trimethylethoxysilane, dimethyldimethoxysilane and methyltriethoxysilane; silicone silane treating agents such as hexamethyldisiloxane and dimethylsiloxane oligomer; amine silane treating agents such as hexamethyldisilazane; and alcohol treating agents such as propyl alcohol, butyl alcohol, hexyl alcohol, octanol and decanol.

Also, if a fluorinated treating agent, obtained by substituting fluorine for part or all of hydrogen of the alkyl group included in any of these treating agents, is used, then not only hydrophobization (water repellency) but also oil repellency and soil resistance are achieved effectively.

It should be noted that the skeleton of an inorganic oxide dry gel may be made of at least silicon dioxide (silica) or aluminum oxide (alumina). Also, the skeleton of an organic polymer dry gel may be made of a normal thermosetting resin or thermoplastic resin such as polyurethane, polyurea and phenol resins, polyacrylamide and polymethyl methacrylate.

In particular, a dry gel having an inorganic oxide skeleton achieves high reliability in terms of moisture resistance and chemical resistance and the acoustic impedance can also exhibit excellent temperature characteristic. Specifically, by using a dry gel of an inorganic oxide, an acoustic matching layer, of which the variation in acoustic impedance per temperature is −0.04%/° C. or less (i.e., has an absolute value of 0.04%/° C. or less) in the range of 25° C. to 70° C., can be obtained. In contrast, if the conventional epoxy and glass balloon or organic polymer gel is used, then it is difficult to decrease the absolute value of the variation in acoustic impedance per temperature to 0.04%/° C. or less.

If the variation in acoustic impedance per temperature is small, high measuring precision is achieved in a broad temperature range when the acoustic matching layer is applied to an ultrasonic flowmeter as will be described later.

As the additive (or binder) 3b to bond together the particles of the powder dry gel 3a and thereby increase the mechanical strength of the acoustic matching layer 3A, a polymer powder with thermal binding property is preferably used. If a liquid material is used, then the liquid material may permeate the micropores of the dry gel to affect the acoustic performance or decrease the compactability. For that reason, a solid material (e.g., a powder among other things) is preferably used.

As used herein, the "thermal binding polymer" refers to a polymer which is solid at room temperature, melts or softens when heated, and then solidifies. Examples of preferred thermal binding polymers include not only normal thermoplastic resins (i.e., engineering plastics such as polyethylene and polypropylene) but also thermosetting resins, which are solid at room temperature, once soften when heated but crosslink and cure thereafter (e.g., phenol resins, epoxy resins and urethane resins). Also, if a thermosetting resin includes a main agent and a curing agent, then these two agents may be added as separate powders. Naturally, a mixture of a thermoplastic resin and a thermosetting resin may also be used. The thermal binding polymer powder preferably has a melting (or softening) temperature of 80° C. to 250° C.

In the process step of pressing and compacting the mixture of the powder dry gel 3a and the additive while heating the mixture, the thermal binding polymer used as the additive typically melts or softens once, and then solidifies and/or crosslinks and cures when cooled, thereby bonding the particles of the powder dry gel 3a together as will be described later.

The thermal binding polymer powder preferably has a mean particle size of 0.1 μm to 50 μm. The reasons are as follows. Specifically, if the mean particle size was smaller than this lower limit, then the size would be close to the pore diameter of the powder dry gel, thus possibly decreasing the binding property or compactability. On the other hand, if the mean particle size was greater than the upper limit, then the amount of the additive needed in the compacting process step would increase too much to obtain a low-density acoustic matching layer easily.

Also, the amount of the thermal binding polymer powder to be added is preferably at most 40 mass % of the overall mixture. This is because if the polymer powder was added to more than 40 mass % of the overall mixture, then the density of the resultant compact might be too high. However, to achieve a sufficient mechanical strength, the amount of the polymer powder added is preferably at least 5 mass % of the overall mixture.

To strengthen the bond between the additive described above (which will be sometimes referred to herein as "additive A") and the powder dry gel, a fiber such as an inorganic fiber (e.g., glass wool) or an organic fiber or a whisker (which will be sometimes referred to herein as "additive B") may be further added as in the acoustic matching layer 3B schematically shown in FIG. 1(b). In the acoustic matching layer 3B shown in FIG. 1(b), the additive 3b is the same thermal binding polymer powder as that described above, while the additive 3c is a short fiber. The preferred diameter range of the short fiber substantially corresponds with the preferred mean particle size range of the thermal binding polymer powder. The fiber preferably has a length of about several μm to about several mm.

The total amount of these two additives is preferably at most 40 mass % of the overall mixture. The mixture ratio is appropriately defined depending on the necessity.

Furthermore, the acoustic matching layer made of the powder dry gel of the present invention can have its acoustic impedance adjusted easily. For example, if multiple types of powder dry gels with mutually different densities are mixed together, the acoustic impedance can be adjusted. The acoustic impedance can also be adjusted by changing the amount (s) of the additive A (and the additive B if necessary). Naturally, the amounts of the additives A and B preferably fall within the ranges defined above in view of the compactability, for example.

It should be noted that each of the acoustic matching layers 3A and 3B preferably has a thickness that is approximately equal to a quarter of the wavelength λ of an acoustic wave being propagated through the acoustic matching layer.

An ultrasonic transducer fabricating method according to an embodiment of the second aspect of the present invention is a method for fabricating an ultrasonic transducer that includes a piezoelectric layer and an acoustic matching layer provided on the piezoelectric layer. The process of forming the acoustic matching layer includes the steps of: (a) preparing a gel material solution; (b) providing a thickness regulating member having a predetermined height on a surface on which the acoustic matching layer will be defined; (c) feeding the gel material solution onto the surface; (d) substantially equalizing the thickness of a liquid layer, defined by the gel material solution that has been fed onto the surface, with the height of the thickness regulating member; (e) solidifying the gel material solution into a wet gel; and (f) drying the wet gel with a solvent removed therefrom, thereby obtaining the dry gel. Accordingly, the thickness of the acoustic matching layer is controlled at a predetermined thickness, thus minimizing the variation in property, which is usually caused by a variation in the thickness.

By making the acoustic matching layer of the powder dry gel, the variation in characteristic can be naturally further reduced. In addition, by using the powder dry gel, the productivity of the ultrasonic transducers can be increased because the powder dry gel can be prepared in advance. That is to say, in the ultrasonic transducer manufacturing process described above, the process steps of solidifying the gel material solution into a wet gel and drying the wet gel can be carried out in advance, thus increasing the throughput of the ultrasonic transducers being manufactured.

Figure 10:
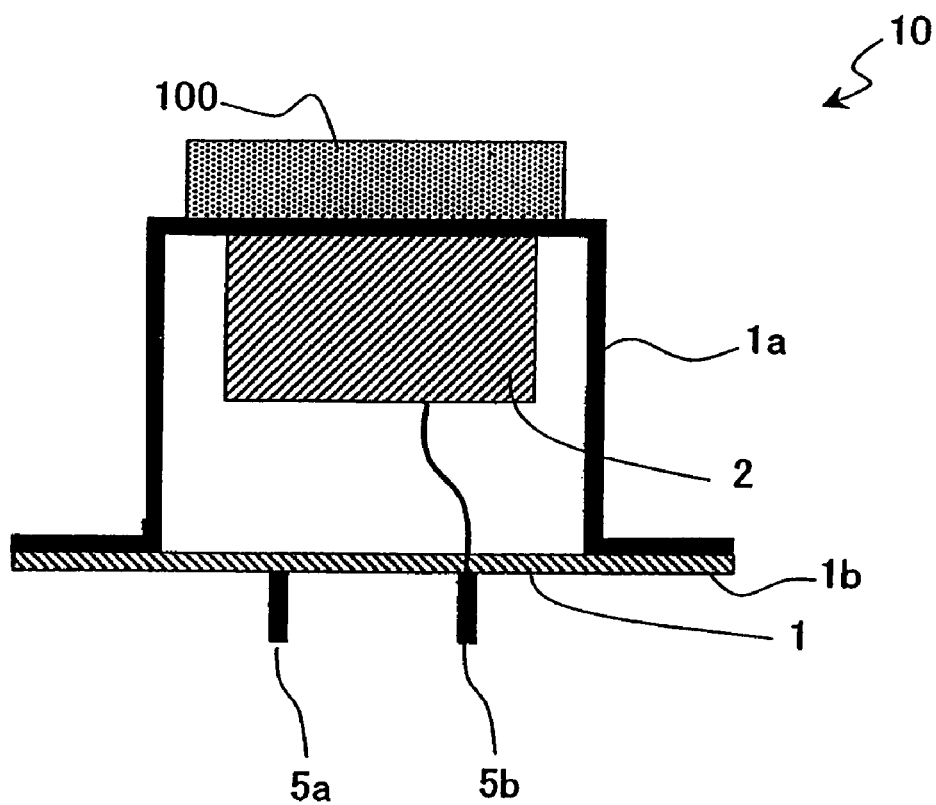
FIG. 10 is a cross-sectional view schematically showing the structure of a conventional ultrasonic transducer.
Figure 11A:
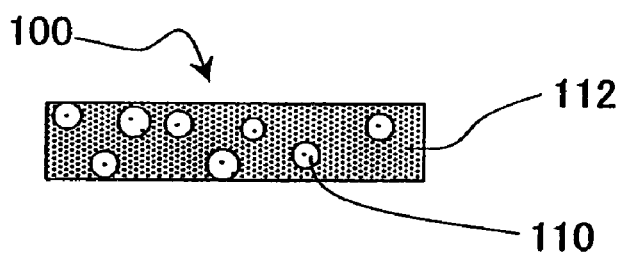
FIGS. 11(a) and 11(b) are respectively a cross-sectional view and a plan view schematically showing the structure of an acoustic matching layer in a conventional ultrasonic transducer.
Figure 11B:
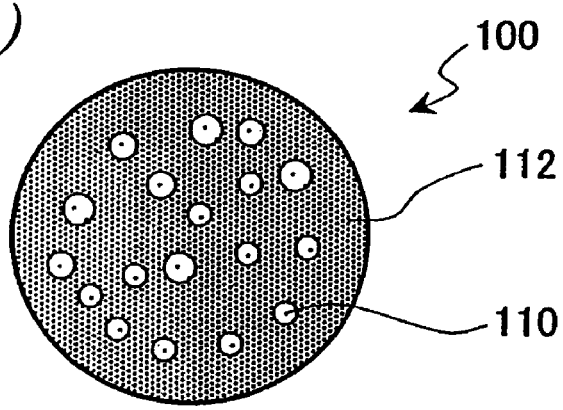

Hereinafter, more specific embodiments of the present invention will be described. The ultrasonic transducer has the same basic structure as the conventional ultrasonic transducer 10 shown in FIG. 10 except for the acoustic matching layer and its bonding structure. Thus, the description of the common structure will be omitted herein.

After that, an embodiment of a method for fabricating an ultrasonic transducer by making the acoustic matching layer 100 shown in FIG. 8 and then bonding it to a piezoelectric layer 2 or a case 1 will be described with reference to FIGS. 2 through 7.

Embodiment 1

Figure 2:
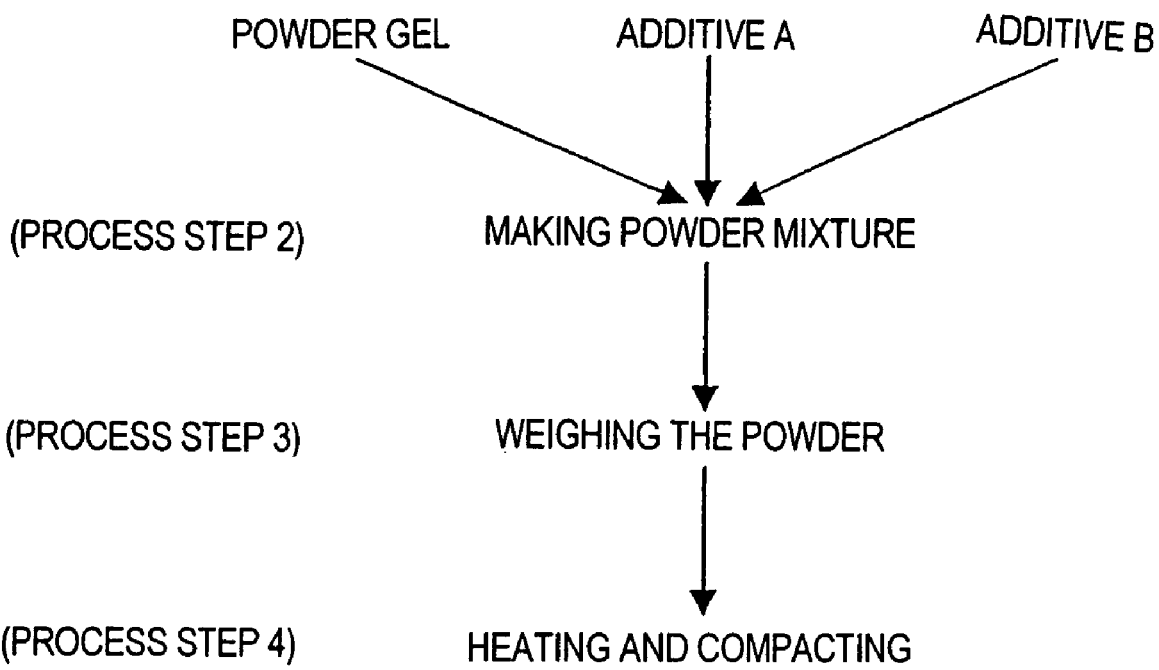
FIG. 2 is a process diagram showing a manufacturing process of an ultrasonic transducer according to a first embodiment of the present invention.
Figure 2:
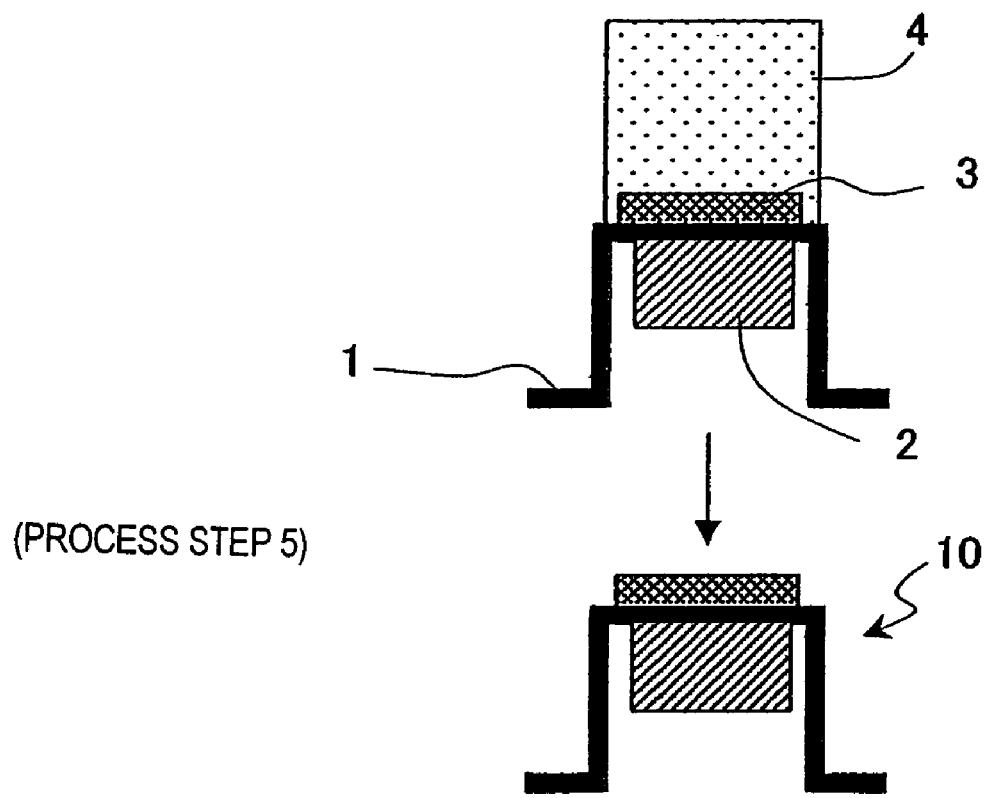

FIG. 2 is a process diagram showing a manufacturing process of an ultrasonic transducer including an acoustic matching layer according to a first embodiment of the present invention. Hereinafter, this manufacturing process will be described in the order of Process Steps Nos. 1, 2, 3 and 4.

Process Step No. 1: preparing a low-density powder dry gel of a porous body (with a density of about 200 kg/M$^3$ to about 400 kg/m$^3$) and additives A and B, which account for about 10 mass % of the overall mixture. In this process step, the dry gel to be prepared does not have to be a powder but may be blocks. The dry gel may be a silica dry gel with an average pore diameter of 20 nm. The additive A may be a polypropylene powder. And the additive B may be a glass wool with a fiber diameter of about 10 μm;

Process Step No. 2: putting the dry gel and additives A and B into the same container, mixing them together and pulverizing the mixture, thereby obtaining a fine powder. This process step is typically carried out with a mill. In this process step, the pulverization conditions are adjusted such that a powder dry gel with the desired mean particle size described above can be obtained. Also, the powder may be classified if necessary. It is naturally possible to carry out the dry gel pulverizing process step and the mixing process step separately;

Process Step No. 3: weighing the powder mixture consisting of the low-density powder dry gel and additives A and B to a desired amount and then feeding the mixture onto a case 1 to which a piezoelectric layer 2 has already been adhered; and Process Step No. 4: providing a thickness regulating member (control member) 4 on the mixture 3 so as to control the thickness of a resultant compact of the powder mixture 3 at about $\lambda/4$, and then heating, pressing, and compacting the mixture 3. Then, the additive A will melt once and then solidify when cooled, thereby fixing the low-density powder dry gel together. On the other hand, the additive B will function so as to further increase the strength of the bond that has been once created by the additive A between the particles of the powder dry gel. As a result, a relatively hard acoustic matching layer can be obtained.

In this manner, the acoustic matching layer 3, consisting of the powder dry gel and the additives A and B, can be bonded onto the case 1 without using any adhesive.

Naturally, it is preferable to control the thickness of the acoustic matching layer being made of the powder dry gel as described above. However, just by using the powder dry gel, acoustic matching is still achieved with the variation in characteristic significantly reduced as compared with the conventional one. Also, according to the method described above, the acoustic matching layer 3 can be directly bonded onto the case 1 without using any adhesive. Thus, unlike the conventional process, no epoxy adhesive is needed and the chemical stability (e.g., against a gas containing sulfur (S)) increases. Depending on the intended application, however, an acoustic matching layer that has been separately prepared in advance may be bonded onto the case with an adhesive.

Optionally, while the powder dry gel is being pressed, heated and compacted to define the acoustic matching layer, the piezoelectric body may be adhered at the same time.

According to this embodiment, a low-density hard acoustic matching layer with low acoustic impedance and highly accurate thickness can be defined with high precision. Also, by using such an acoustic matching layer, a high-sensitivity, high-reliability and high-stability ultrasonic transducer can be obtained.

In the specific embodiment described above, the case 1 includes a top plate 1a, which defines a concave portion to embed the piezoelectric layer 2 therein, and a bottom plate 1b, which is arranged so as to close up the inner space of the concave portion hermetically. However, the present invention is in no way limited to such a specific preferred embodiment. For example, the acoustic matching layer 3 may be directly bonded onto the piezoelectric layer 2 and then the assembly may be included in a cylindrical case hermetically.

Embodiment 2

Figure 3:
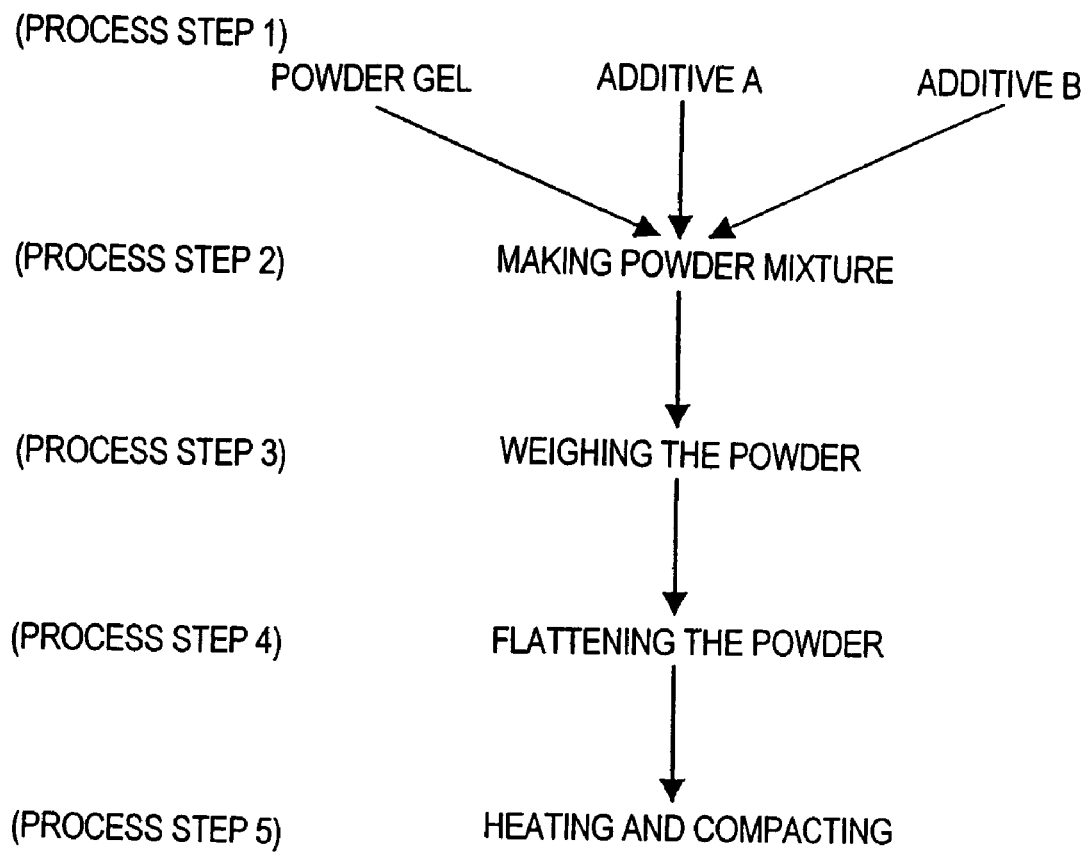
FIG. 3 is a process diagram showing a manufacturing process of an ultrasonic transducer according to a second embodiment of the present invention.
Figure 3:
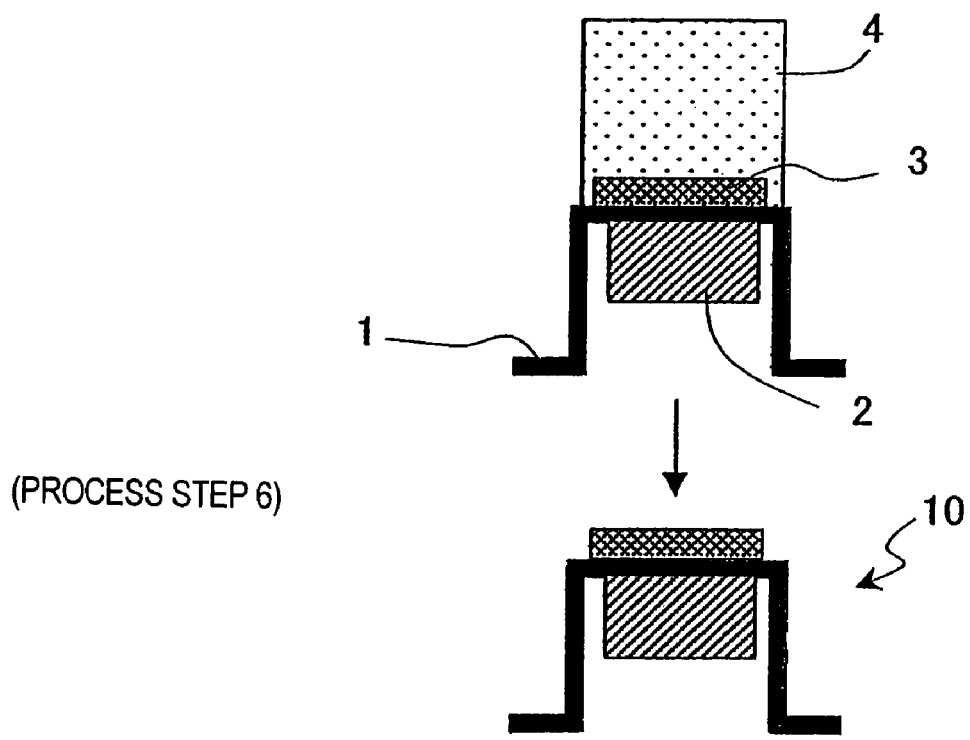

FIG. 3 is a process diagram showing a manufacturing process of an ultrasonic transducer including an acoustic matching layer according to a second embodiment of the present invention. Hereinafter, this manufacturing process will be described in the order of Process Steps Nos. 1, 2, 3, 4 and 5.

Process Step No. 1: preparing a low-density powder dry gel of a porous body and additive A, which accounts for about 10 mass % of the overall mixture. In this process step, the additive A includes an epoxy resin powder as a main agent (which will be referred to herein as "additive A1") and a polyamide resin powder as a curing agent for the epoxy resin (which will be referred to herein as "additive A2");

Process Step No. 2: putting the dry gel and additives A1 and A2 into the same container, mixing them together and pulverizing the mixture, thereby obtaining a fine powder;

Process Step No. 3: weighing the powder mixture consisting of the low-density powder dry gel and additives A1 and A2 to a desired amount and then feeding the mixture onto a case 1 to which a piezoelectric layer 2 has already been adhered;

Up to this process step, the manufacturing process may be carried out as in the first embodiment described above.

Process Step No. 4: vibrating the case 1, on which the powder mixture 3 has been fed, with a shaker, for example, thereby flattening the layer of the powder mixture 3; and Process Step No. 5: providing a thickness regulating member (control member) 4 on the mixture 3 so as to control the thickness of a resultant compact of the powder mixture 3 at about $\lambda/4$, and then heating, pressing, and compacting the mixture 3. Then, the additives A1 and A2 will cause a cross-linking curing reaction, thereby fixing the low-density powder dry gel together. As a result, a relatively hard acoustic matching layer (with excellent mechanical strength) can be obtained.

In this manner, the acoustic matching layer, consisting of the powder dry gel and the additives A and B, can be bonded onto the case 1 without using any adhesive.

Optionally, while the powder dry gel is being pressed, heated and compacted to define the acoustic matching layer, the piezoelectric body may be adhered at the same time.

The manufacturing process of this embodiment further includes the process step of flattening the upper surface of the powder mixture layer before the process step of forming a compact of the powder mixture by pressing and compacting the mixture. Thus, the resultant acoustic matching layer should exhibit a further reduced variation in characteristic than the acoustic matching layer of the first embodiment described above.

Embodiment 3

Figure 4:
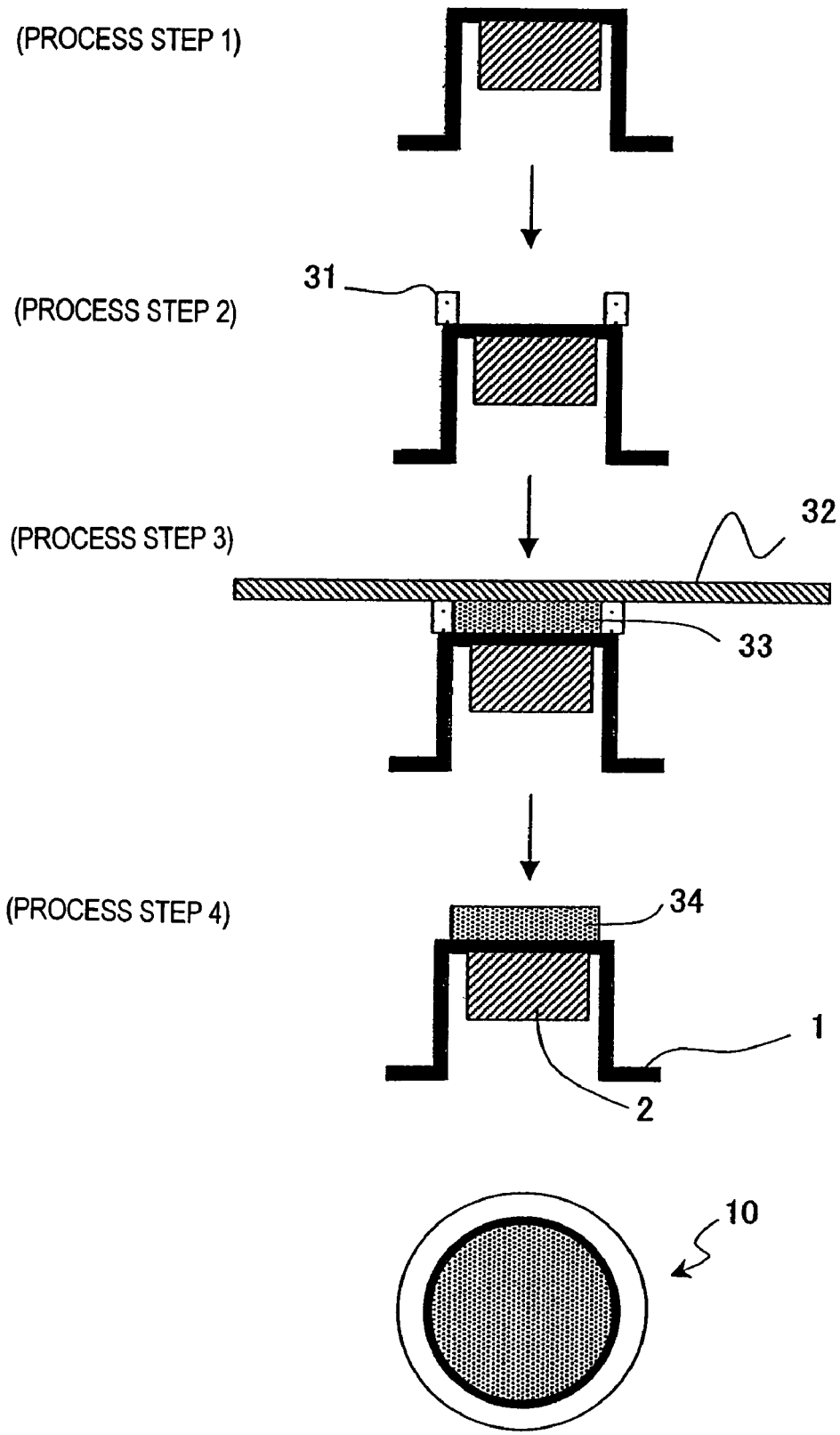
FIG. 4 is a process diagram showing a manufacturing process of an ultrasonic transducer according to a third embodiment of the present invention.

FIG. 4 is a process diagram showing a manufacturing process of an ultrasonic transducer including an acoustic matching layer according to a third embodiment of the present invention. Hereinafter, this manufacturing process will be described in the order of Process Steps Nos. 1, 2, 3 and 4.

Process Step No. 1: bonding a piezoelectric layer 2 to a case 1 with a known adhesive, for example;

Process Step No. 2: providing an O-ring 31 of an organic film, for example, as a thickness regulating member (control member) on the case 1 so as to control the thickness of the acoustic matching layer at about $\lambda/4$;

Process Step No. 3: dripping, as a sol solution, a silicate aqueous solution with a pH of 9 to 10 onto the case 1 on which the O-ring 31 has been disposed, adjusting the pH of the silicate aqueous solution to 5.5, and then forming a wet gel 33 with the assembly capped with a flat plate 32. In gelling this silicate aqueous solution, an OH group on the surface of the case 1 and a silanol group of the material react with each other to produce a chemical bond between them. As a result, a wet gel film is formed on the surface of the case 1; and Process Step No. 4: hydrophobizing and dehydrating the resultant wet gel with an acetone solution of trimethylchlorosilane (TMSC), replacing the solvent with hexane, and then drying the wet gel in a container that is maintained at 100° C., thereby forming a silica dry gel film 34 of silicon dioxide. Then, the low-density dry gel film is fixed to define an acoustic matching layer.

In this manner, the acoustic matching layer of the dry gel can be bonded onto the case 1 without using any adhesive.

Optionally, the piezoelectric body may also be bonded after the acoustic matching layer of the dry gel has been formed.

Consequently, a low-density acoustic matching layer with low acoustic impedance and highly accurate thickness can be defined with high precision. Also, by using such an acoustic matching layer, a high-sensitivity, high-reliability and high-stability ultrasonic transducer can be obtained.

Embodiment 4

Figure 5:
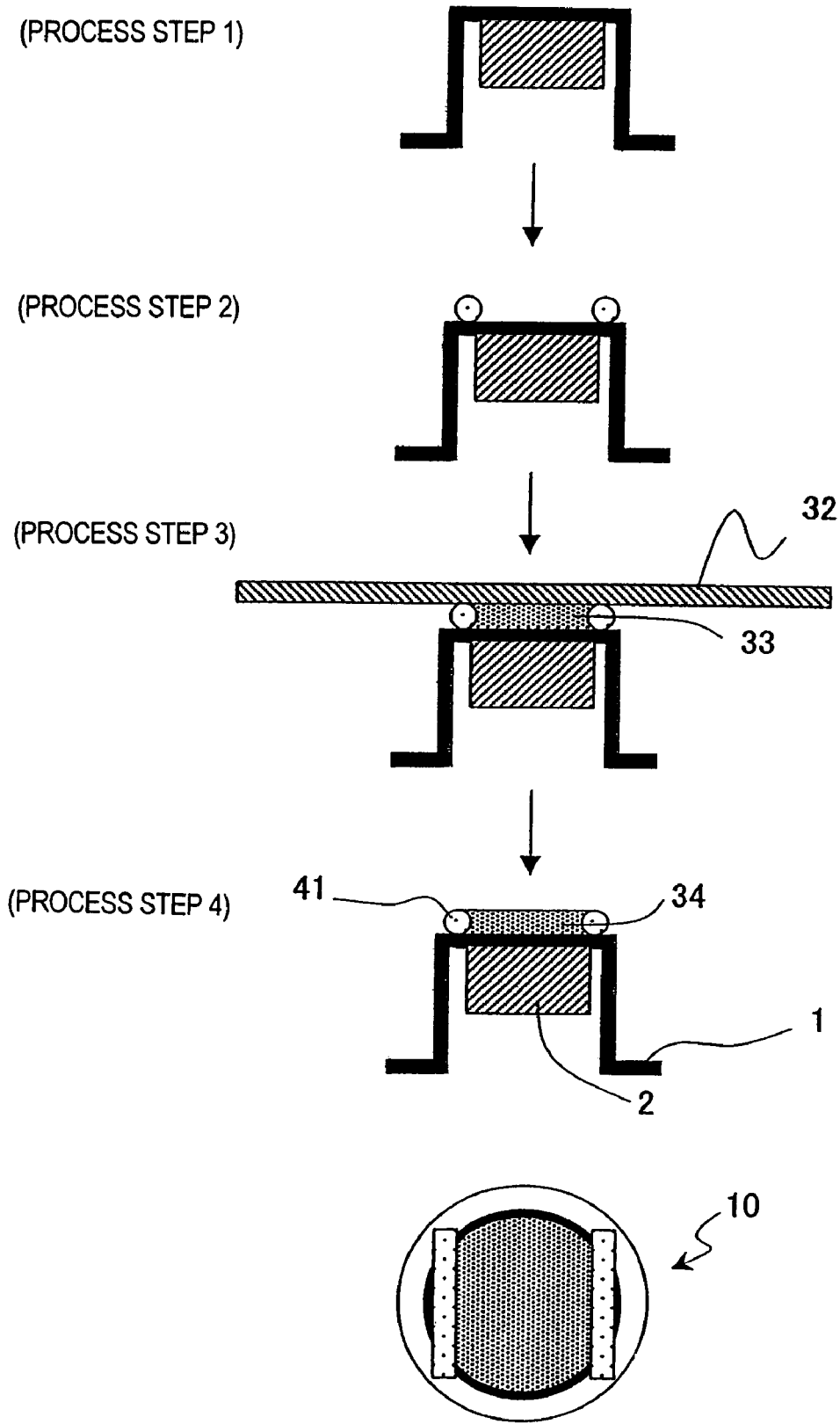
FIG. 5 is a process diagram showing a manufacturing process of an ultrasonic transducer according to a fourth embodiment of the present invention.

FIG. 5 is a process diagram showing a manufacturing process of an ultrasonic transducer including an acoustic matching layer according to a fourth embodiment of the present invention. Hereinafter, this manufacturing process will be described in the order of Process Steps Nos. 1, 2, 3 and 4.

Process Step No. 1: adhering a piezoelectric layer 2 to a case 1;

Process Step No. 2: providing a wire 41 of a metal, for example, as a thickness regulating member (control member) on the case 1 so as to control the thickness of the acoustic matching layer at about $\lambda/4$;

Process Step. No. 3: dripping, as a sol solution, a silicate aqueous solution with a pH of 9 to 10 onto the case 1 on which the wire 41 has been disposed, adjusting the pH of the silicate aqueous solution to 5.5, and then forming a wet gel 33 with the assembly capped with a flat plate 32. In gelling this silicate aqueous solution, an OH group on the surface of the case 1 and a silanol group of the material react with each other to produce a chemical bond between them. As a result, a wet gel film is formed on the surface of the case 1; and Process Step No. 4: hydrophobizing and dehydrating the resultant wet gel with an acetone solution of trimethylchlorosilane (TMSC), replacing the solvent with hexane, and then drying the wet gel in a container that is maintained at 100° C., thereby forming a silica dry gel film 34 of silicon dioxide. Then, the low-density dry gel film is fixed to define an acoustic matching layer.

In this manner, the acoustic matching layer of the dry gel can be bonded onto the case 1 without using any adhesive.

Optionally, the piezoelectric body may also be bonded after the acoustic matching layer of the dry gel has been formed.

Consequently, a low-density acoustic matching layer with low acoustic impedance and highly accurate thickness can be defined with high precision. Also, by using such an acoustic matching layer, a high-sensitivity, high-reliability and high-stability ultrasonic transducer can be obtained.

Embodiment 5

Figure 6:
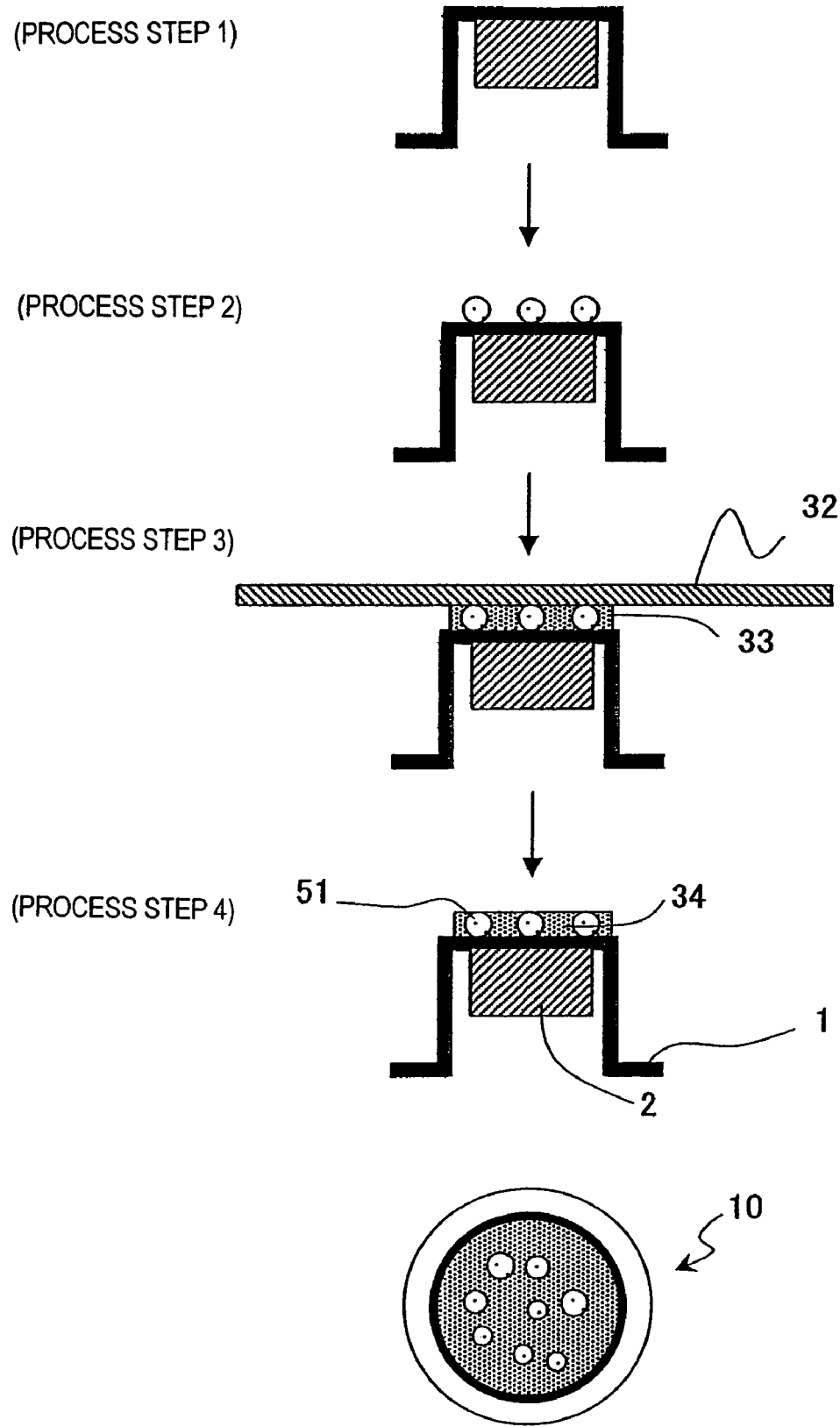
FIG. 6 is a process diagram showing a manufacturing process of an ultrasonic transducer according to a fifth embodiment of the present invention.

FIG. 6 is a process diagram showing a manufacturing process of an ultrasonic transducer including an acoustic matching layer according to a fifth embodiment of the present invention. Hereinafter, this manufacturing process will be described in the order of Process Steps Nos. 1, 2, 3 and 4.

Process Step No. 1: adhering a piezoelectric layer 2 to a case 1;

Process Step No. 2: providing beads 51 as thickness control members on the case 1 so as to control the thickness of the acoustic matching layer at about $\lambda/4$. The beads 51 may be made of any material unless the beads 51 fuse or degrade in a subsequent process step. For example, the beads may be made of an inorganic material such as glass or an organic material such as a cross-linked polymer;

Process Step No. 3: dripping, as a sol solution, a silicate aqueous solution with a pH of 9 to 10 onto the case 1 on which the beads 51 have been dispersed, adjusting the pH of the silicate aqueous solution to 5.5, and then forming a wet gel 33 with the assembly capped with a flat plate 32. In gelling this silicate aqueous solution, an OH group on the surface of the case 1 and a silanol group of the material react with each other to produce a chemical bond between them. As a result, a wet gel film is formed on the surface of the case 1; and Process Step No. 4: hydrophobizing and dehydrating the resultant wet gel with an acetone solution of dimethyldimethoxysilane, replacing the solvent with hexane, and then drying the wet gel in a container that is maintained at 100° C., thereby forming a silica dry gel film 34 of silicon dioxide. Then, the low-density dry gel film is fixed to define an acoustic matching layer.

In this manner, the acoustic matching layer of the dry gel can be bonded onto the case 1 without using any adhesive.

Optionally, the piezoelectric body may also be bonded after the acoustic matching layer of the dry gel has been formed.

Consequently, a low-density acoustic matching layer with low acoustic impedance and highly accurate thickness can be defined with high precision. Also, by using such an acoustic matching layer, a high-sensitivity, high-reliability and high-stability ultrasonic transducer can be obtained.

Embodiment 6

Figure 7:
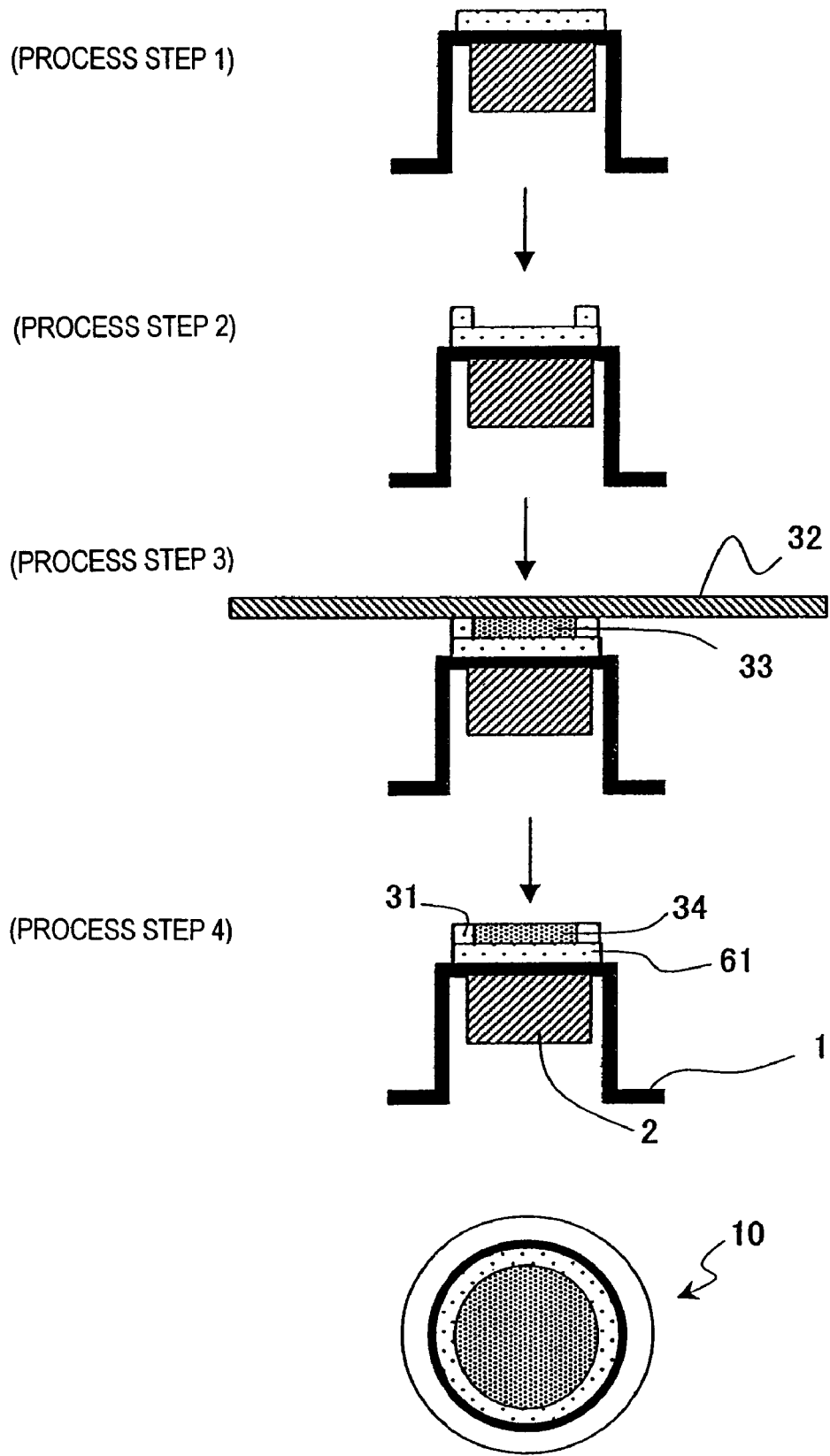
FIG. 7 is a process diagram showing a manufacturing process of an ultrasonic transducer according to a sixth embodiment of the present invention.

FIG. 7 is a process diagram showing a manufacturing process of an ultrasonic transducer including an acoustic matching layer according to a sixth embodiment of the present invention. Hereinafter, this manufacturing process will be described in the order of Process Steps Nos. 1, 2, 3 and 4.

Process Step No. 1: adhering a piezoelectric layer 2 and a ceramic 61 to a case 1. The ceramic 61 will function as a first acoustic matching layer. Examples of preferred ceramics 61 include silica, alumina and zirconia;

Process Step No. 2: providing an O-ring 31 of an organic film, for example, as a thickness regulating member (control member) along the periphery of the ceramic 61 on the case 1 so as to control the thickness of the acoustic matching layer at about $\lambda/4$;

Process Step No. 3: dripping, as a sol solution, a silicate aqueous solution with a pH of 9 to 10 onto the ceramic 61 on which the O-ring 31 has been disposed, adjusting the pH of the silicate aqueous solution to 5.5, and then forming a wet gel 33 with the assembly capped with a flat plate 32. In gelling this silicate aqueous solution, an OH group on the surface of the case 1 and a silanol group of the material react with each other to produce a chemical bond between them. As a result, a wet gel film is formed on the surface of the case 1; and Process Step No. 4: hydrophobizing and dehydrating the resultant wet gel with an acetone solution of trimethylchlorosilane (TMSC), and then drying the wet gel in a container that is maintained at 50° C., thereby forming a silica dry gel film 34 of silicon dioxide. Then, the low-density dry gel film is fixed to define an acoustic matching layer. Thereafter, the bottom plate (a cap plate) of the case 1, drive terminals and so on are attached to the assembly, thereby completing a piezoelectric vibrator 10.

In this manner, the acoustic matching layer of the dry gel can be bonded onto the ceramic 61 without using any adhesive. In addition, high sensitivity is achieved by the acoustic matching layer consisting of the two layers.

Optionally, the piezoelectric body may also be bonded after the acoustic matching layer of the dry gel has been formed.

When such an acoustic matching layer consisting of the two layers (one of which is closer to the piezoelectric layer and will be referred to herein as a "first acoustic matching layer" and the other of which faces the gas and will be referred to herein as a "second acoustic matching layer") is adopted, the acoustic impedance Zb of the second acoustic matching layer is preferably smaller than the acoustic impedance Za of the first acoustic matching layer. The first acoustic matching layer preferably has a density of 400 kg/m$^3$ to 1,500 kg/m$^3$, while the second acoustic matching layer preferably has a density of 50 kg/m$^3$ to 500 kg/m$^3$. And the density of the second acoustic matching layer is preferably lower than that of the first acoustic matching layer. For example, the density of the first acoustic matching layer may be higher than 400 kg/m$^3$ but equal to or lower than 800 kg/m$^3$, while the density of the second acoustic matching layer may be in the range of 50 kg/m$^3$ to 400 kg/m$^3$.

Examples of specific materials of the first acoustic matching layer include the ceramics mentioned above and various known materials such as fiber bodies or sintered porous bodies of inorganic materials and materials obtained by solidifying a glass balloon or a plastic balloon with a resin matrix. On the other hand, a second acoustic matching layer made of a dry gel can satisfy the conditions described above.

According to this embodiment, a low-density second acoustic matching layer with low acoustic impedance and highly accurate thickness can be defined, thus further improving the characteristic of the two-layered acoustic matching layer. Consequently, by using the acoustic matching layer of this embodiment, a high-sensitivity, high-reliability and high-stability ultrasonic transducer can be obtained.

Embodiment 7

Figure 8:
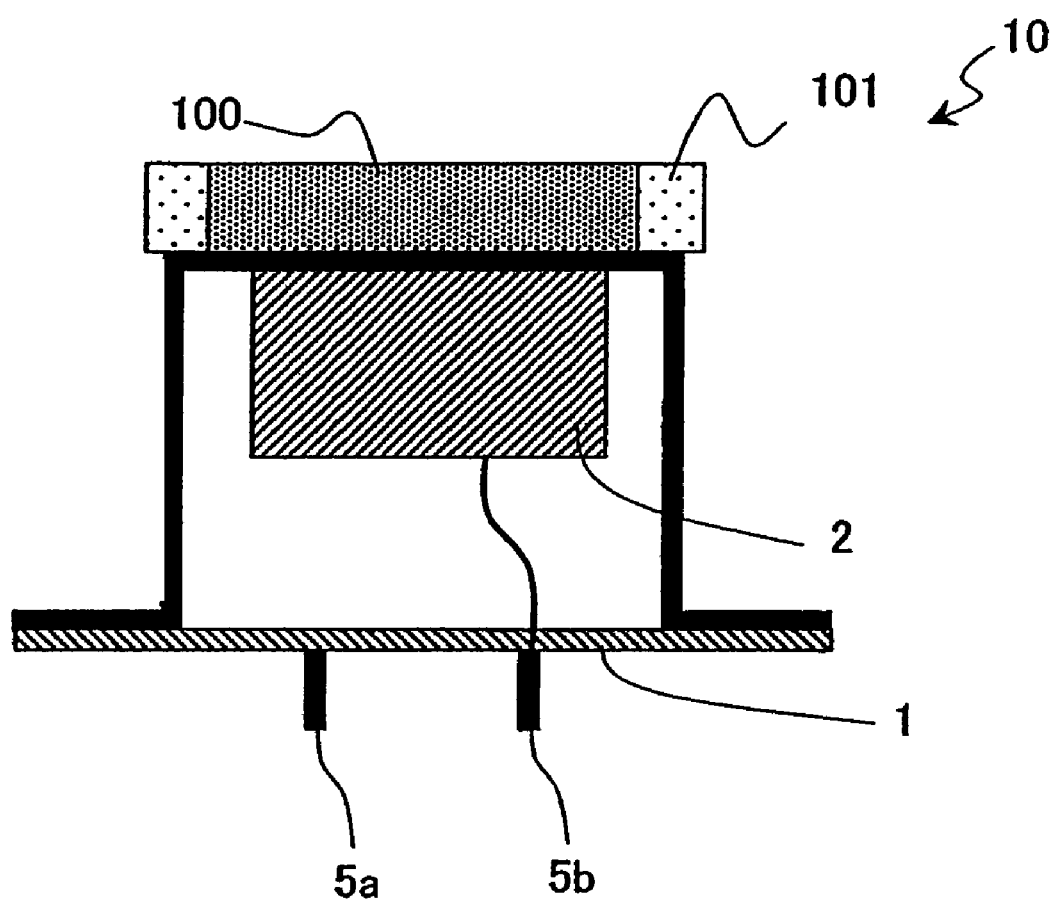
FIG. 8 is a cross-sectional view of an ultrasonic transducer according to the present invention.
Figure 9:
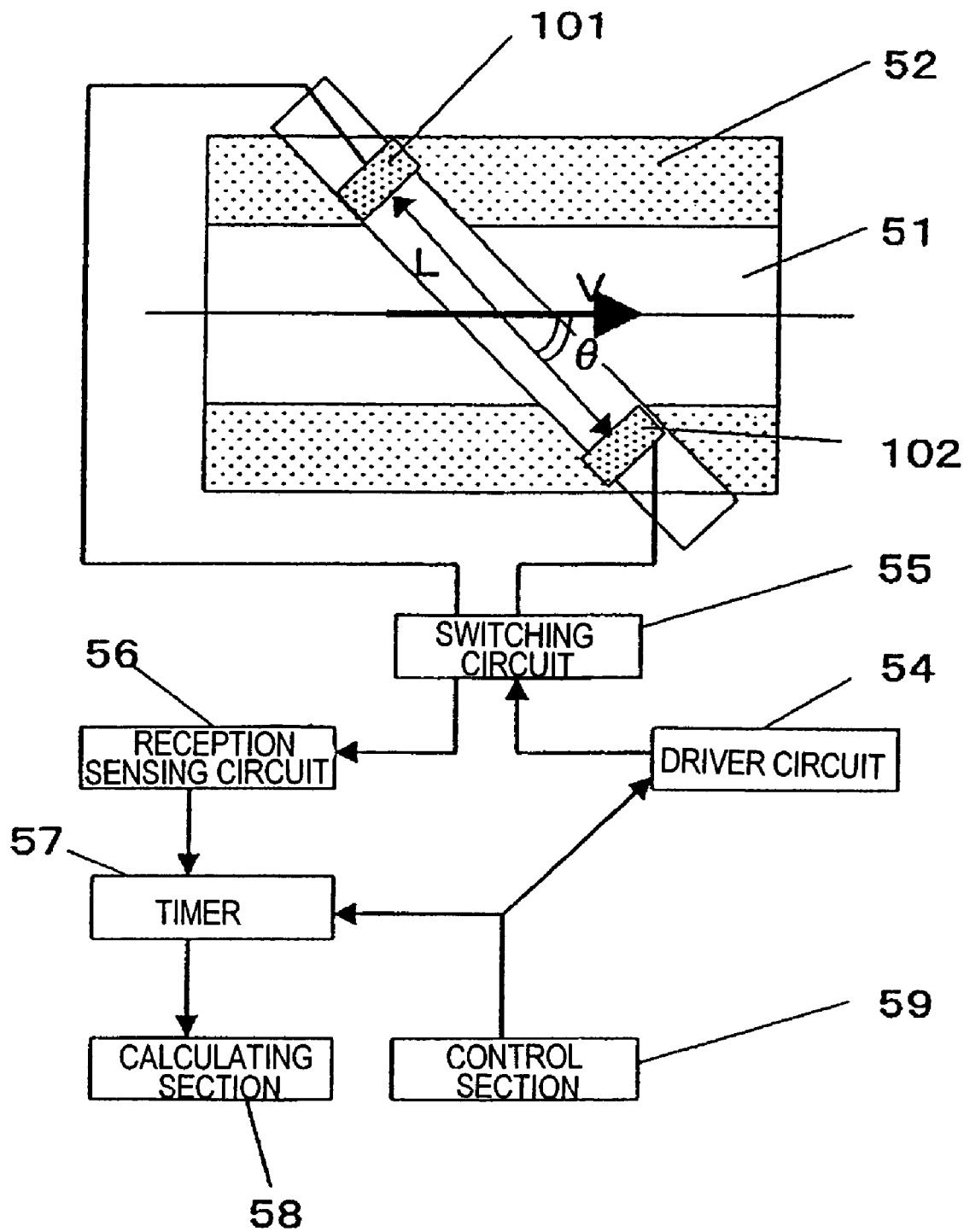
FIG. 9 is a block diagram schematically showing a configuration for an ultrasonic flowmeter including a conventional ultrasonic transducer.

FIG. 8 is a cross-sectional view of the piezoelectric vibrator of an ultrasonic transducer for use in an ultrasonic flowmeter according to the present invention. In FIG. 8, the piezoelectric vibrator 10 for converting electricity into ultrasonic waves, or vice versa, includes a piezoelectric layer 2 and an acoustic matching layer 100. The piezoelectric layer 2 generates ultrasonic vibrations, is made of a piezoceramic or piezoelectric single crystals, for example, is polarized in the thickness direction, and includes electrodes on the upper and lower surfaces thereof. The acoustic matching layer 100 either transmits an ultrasonic wave into a gas or receives an ultrasonic wave that has been propagated through a gas. The acoustic matching layer 100 functions such that the mechanical vibrations of the piezoelectric layer 2 to be excited by an AC drive voltage are efficiently radiated as ultrasonic waves into an external medium or that the incoming ultrasonic wave is converted into a voltage efficiently. The acoustic matching layer 100 is formed by the method of any of the preferred embodiments described above. And the acoustic matching layer 100 is attached to the outside surface of the case 1 through chemical bonding so as to define an ultrasonic wave transmitting/receiving surface for the piezoelectric layer 2.

Furthermore, the thickness of the acoustic matching layer 100 is exactly defined by a thickness control member 101. Thus, the acoustic matching layer 100 has almost no surface unevenness.

In the ultrasonic transducer having such a configuration, when a burst signal voltage, having an AC signal component with a frequency that is close to the resonant frequency of the ultrasonic transducer, is applied to the drive terminal, the piezoelectric vibrator 10 vibrates in a thickness vibration mode, and radiates a burst ultrasonic wave into a fluid such as a gas or a liquid.

INDUSTRIAL APPLICABILITY

An acoustic matching layer according to a first aspect of the present invention includes a powder of a dry gel. Thus, the variation in characteristic, which would otherwise be caused by the non-uniformity of a wet gel being dried, can be minimized.

According to a second aspect of the present invention, the thickness of an acoustic matching layer is controlled during the process step of making the acoustic matching layer. Thus, the variation in characteristic, which would otherwise be caused due to the non-uniform thickness or surface unevenness of the acoustic matching layer, can be minimized.

Furthermore, while a dry gel is being made of an inorganic oxide or an organic polymer, an OH group on the surface of the piezoelectric body or the container (or case) and a material component react with each other to produce a chemical bond between them. In this manner, the dry gel can be bonded onto the piezoelectric body or the container. Thus, an ultrasonic transducer with no adhesive layer (i.e., a so-called "adhesiveless ultrasonic transducer") can be obtained advantageously.

Also, by providing such an acoustic matching layer, having a highly accurate thickness and made of an inorganic oxide or an organic polymer, on a conventional acoustic matching layer, an ultrasonic transducer with even higher sensitivity can be obtained.

What is claimed is:

1. An acoustic matching layer comprising a layer of a powder of a dry gel whose acoustic impedance is matched with a piezoelectric layer with which the matching layer is associated.

2. The acoustic matching layer of claim 1, wherein the dry gel has a density of 500 kg/m$^3$ or less and an average pore diameter of 100 nm or less.

3. The acoustic matching layer of claim 1, wherein the powder of the dry gel has a mean particle size of 1 $\mu$m to 100 $\mu$m.

4. The acoustic matching layer of claim 1, wherein a skeleton of the dry gel includes an inorganic oxide.

5. The acoustic matching layer of claim 3, wherein the inorganic oxide is silicon dioxide or aluminum oxide.

6. The acoustic matching layer of claim 1, further comprising a thermal binding polymer powder mixed with the powder of a dry gel, wherein an amount of the thermal binding polymer powder is at most 40 mass % of a total of the thermal binding polymer powder and the powder of a dry gel.

7. The acoustic matching layer of claim 6, wherein the thermal binding polymer powder has a mean particle size of 0.1 $\mu$m to 50 $\mu$m.

8. The acoustic matching layer of claim 1, wherein the acoustic matching layer has an acoustic impedance of 5×10$^4$ kg/s·m$^2$ to 20×10$^4$ kg/s·m$^2$.

9. The acoustic matching layer of claims 1, wherein a variation in the acoustic impedance of the acoustic matching layer per temperature is −0.04%/° C. or less in the range of 25° C. to 70° C.

10. The acoustic matching layer of claim 1, wherein the acoustic matching layer has a thickness that is approximately equal to a quarter of the wavelength λ of an acoustic wave being propagated through the acoustic matching layer.

11. An ultrasonic transducer comprising: a piezoelectric layer; and an acoustic matching layer including a powder of a dry gel, which is provided on the piezoelectric layer.

12. The ultrasonic transducer of claim 11, wherein the acoustic matching layer is directly bonded onto the piezoelectric layer.

13. The ultrasonic transducer of claim 11, further comprising a case, the case including: a top plate that defines a concave portion to embed the piezoelectric layer therein; and a bottom plate that is arranged so as to close up an inner space of the concave portion hermetically,
    wherein the piezoelectric layer is adhered onto an inside surface of the top plate of the case, and
    wherein the acoustic matching layer is directly bonded onto the upper surface of the top plate so as to face the piezoelectric layer by way of the top plate.

14. An ultrasonic flowmeter comprising: a flow rate measuring portion, through which a fluid under measurement flows; a pair of ultrasonic transducers, which is provided for the flow rate measuring portion and which transmits and receives an ultrasonic signal; a time measurement circuit for measuring time that it takes to propagate an ultrasonic wave between the pair of ultrasonic transducers; and a flow rate calculating circuit for calculating the flow rate of the fluid based on a signal supplied from the time measurement circuit, wherein each of the ultrasonic transducers is the ultrasonic transducer of claim 11.

15. The ultrasonic transducer of claim 11, wherein the dry gel has a density of 500 kg/m$^3$ or less and an average pore diameter of 100 nm or less.

16. The ultrasonic transducer of claim 11, wherein the powder of the dry gel has a mean particle size of 1 μm to 100 μm.

17. The ultrasonic transducer of claim 11, wherein a skeleton of the dry gel includes an inorganic oxide.

18. The ultrasonic transducer of claim 17, wherein the inorganic oxide is silicon dioxide or aluminum oxide.

19. The ultrasonic transducer of claim 11, wherein the acoustic matching layer further includes a thermal binding polymer powder, wherein an amount of the thermal binding polymer powder is at most 40 mass % of a total of the thermal binding polymer powder and the powder of a dry gel.

20. The ultrasonic transducer of claim 19, wherein the thermal binding polymer powder has a mean particle size of 0.1 μm to 50 μm.

21. The ultrasonic transducer of claim 11, wherein the acoustic matching layer has an acoustic impedance of 5×10$^4$ kg/s·m$^2$ to 20×10$^4$ kg/s·m$^2$.

22. The ultrasonic transducer of claim 1, wherein a variation in the acoustic impedance of the acoustic matching layer per temperature is −0.04%/° C. or less in the range of 25° C. to 70° C.

23. The ultrasonic transducer of claim 11, wherein the acoustic matching layer has a thickness that is approximately equal to a quarter of the wavelength λ of an acoustic wave being propagated through the acoustic matching layer.

* * * * *

UNITED STATES PATENT AND TRADEMARK OFFICE
CERTIFICATE OF CORRECTION

PATENT NO. : 6,969,943 B2
APPLICATION NO. : 10/475426
DATED : November 29, 2005
INVENTOR(S) : Kazuhiko Hashimoto et al.

It is certified that error appears in the above-identified patent and that said Letters Patent is hereby corrected as shown below:

Title page,
Item [75], Inventors, change addresses for the following:
"Kazuhiko Hashimoto" should read -- Moriguchi-shi (JP) --;
"Takashi Hashida" should read -- Osaka-shi (JP) --;
"Masaaki Suzuki" should read -- Osaka-shi (JP) --;
"Masahiko Hashimoto" should read -- Shijonawate-shi (JP) --;
"Seigo Shiraishi" should read -- Neyagawa-shi (JP) --;
"Norihisa Takahara" should read -- Ibaraki-shi (JP) --;

Column 20,
Line 25, "transducer of claim 1" should read -- transducer of claim 11 --.

Signed and Sealed this

Twenty-seventh Day of June, 2006

JON W. DUDAS
*Director of the United States Patent and Trademark Office*